US010969547B2

(12) United States Patent
Gardes et al.

(10) Patent No.: US 10,969,547 B2
(45) Date of Patent: Apr. 6, 2021

(54) OPTOELECTRONIC DEVICE AND METHOD OF MANUFACTURING THEREOF

(71) Applicant: University of Southampton, Southampton (GB)

(72) Inventors: Frederic Yannick Gardes, Southampton (GB); Katarzyna Monika Grabska, Southampton (GB)

(73) Assignee: UNIVERSITY OF SOUTHAMPTON, Hampshire (GB)

( * ) Notice: Subject to any disclaimer, the term of this patent is extended or adjusted under 35 U.S.C. 154(b) by 0 days.

(21) Appl. No.: 16/619,706

(22) PCT Filed: Jun. 7, 2018

(86) PCT No.: PCT/EP2018/065092
§ 371 (c)(1),
(2) Date: Dec. 5, 2019

(87) PCT Pub. No.: WO2018/224621
PCT Pub. Date: Dec. 13, 2018

(65) Prior Publication Data
US 2020/0200969 A1 Jun. 25, 2020

(30) Foreign Application Priority Data

Jun. 9, 2017 (GB) .................................... 1709213

(51) Int. Cl.
*G02B 6/12* (2006.01)
*G02B 6/122* (2006.01)
(Continued)

(52) U.S. Cl.
CPC ............. *G02B 6/122* (2013.01); *G02B 6/134* (2013.01); *G02B 6/136* (2013.01);
(Continued)

(58) Field of Classification Search
CPC ........ G02B 6/122; G02B 6/134; G02B 6/136; G02B 2006/12061; G02B 2006/12097; G02B 2006/12142; G02B 2006/12169
(Continued)

(56) References Cited

U.S. PATENT DOCUMENTS 6,845,198 B2   1/2005   Montgomery et al.
7,276,770 B1   10/2007  Goushcha et al.
(Continued)

FOREIGN PATENT DOCUMENTS

DE   102004007251   9/2005
EP   2733513 A1     5/2014
(Continued)

OTHER PUBLICATIONS

International Search Report & Written Opinion, prepared by the International Searching Authority European Patent Office, International Application No. PCT/EP2018/065092, dated Oct. 1, 2018, 12 pages.
(Continued)

*Primary Examiner* — Jerry M Blevins
(74) *Attorney, Agent, or Firm* — Adsero IP

(57) ABSTRACT

An optoelectronic device and method of manufacturing the same. The device includes: a layer disposed above a substrate, the layer having a first cavity therein, which cavity is at least partially defined by an inclined interface between the cavity and an insulating liner, the interface being disposed at an angle relative to the substrate of greater than 0° and less than or equal to 90°; and a regrown semiconductor material, providing or forming a part of a waveguide, the regrown semiconductor material being at least partly disposed in the first cavity and including an inclined interface between the regrown semiconductor material and the insulating liner, the
(Continued)

interface being disposed at an angle relative to the substrate of greater than 0° and less than or equal to 90°.

20 Claims, 10 Drawing Sheets

(51) Int. Cl.
  *G02B 6/134* (2006.01)
  *G02B 6/136* (2006.01)
(52) U.S. Cl.
  CPC .............. *G02B 2006/12061* (2013.01); *G02B 2006/12097* (2013.01); *G02B 2006/12142* (2013.01); *G02B 2006/12169* (2013.01)
(58) Field of Classification Search
  USPC .......................................................... 385/40
  See application file for complete search history.

(56) References Cited

U.S. PATENT DOCUMENTS

| | | | |
|---|---|---|---|
| 7,657,130 | B2 | 2/2010 | Shastri et al. |
| 7,697,793 | B2 | 4/2010 | Webster et al. |
| 7,751,654 | B2 | 7/2010 | Lipson et al. |
| 8,014,636 | B2 | 9/2011 | Shubin et al. |
| 8,450,186 | B2 | 5/2013 | Rong et al. |
| 8,520,984 | B2 | 8/2013 | Webster et al. |
| 9,310,629 | B2 | 4/2016 | Patel et al. |
| 9,360,688 | B2 | 6/2016 | Patel et al. |
| 2007/0105335 | A1* | 5/2007 | Fitzgerald ......... H01L 21/76254 438/405 |
| 2013/0163919 | A1 | 6/2013 | Cho |
| 2014/0233878 | A1 | 8/2014 | Goi et al. |
| 2014/0363120 | A1* | 12/2014 | Stephens et al. ...... G02B 6/136 385/14 |
| 2015/0055910 | A1 | 2/2015 | Liang |
| 2015/0362673 | A1 | 12/2015 | Zheng et al. |
| 2017/0299902 | A1* | 10/2017 | Yu et al. ................. G02F 1/025 |
| 2020/0200969 | A1 | 6/2020 | Gardes et al. |

FOREIGN PATENT DOCUMENTS

| | | |
|---|---|---|
| EP | 2813873 A1 | 12/2014 |
| WO | WO-2004-106986 A2 | 12/2004 |
| WO | WO-2015-062456 A3 | 5/2015 |
| WO | WO-2015-161207 A1 | 10/2015 |
| WO | WO-2015-185750 A1 | 12/2015 |
| WO | WO-2018-224621 A1 | 12/2018 |

OTHER PUBLICATIONS

Intellectual Property Office, Search Report on German Application No. GB1709213.1, dated Nov. 20, 2017, 3 pages.
"A high-speed silicon optical modulator based on a metal-oxide-semiconductor capacitor"; Liu A, Jones R, Liao L, et al., Letters to Nature, 4 pages.
Silicon MOS Optical Modulator, http://www.nec.co.jp/press/en/1003/images/2302-01-01.pdf, 1 page.
Silicon MOS Optical Modulator, Appendix, 1 page.
"Scaling and Optimization of MOS Optical Modulators in Nanometer SOI Waveguides"; Vittorio M. N. Passaro et al., IEEE, Jul. 2008, 8 pages.
"High-performance MOS-capacitor-type Si optical modulator and surface-illumination-type Ge photodetector for optical interconnection"; Junichi Fujikata et al. JJAP, 6 pages.
"Next Generation Device Grade Silicon Germanium on Insulator"; Callum G. Littlejohns et al., Scientific Reports, 6 pages.
"High Speed NRZ and PAM Optical Modulation Using CMOS Photonics", Bipin D. Dama et al., Mar. 2012, 15 pages.
Grabska et al., "Multi composition GeSi tuneable concentration silicon-germanium wire structures for CMOS photonics." IEEE 16th International Conference on Group IV Photonics (GFP), Aug. 2019, 2 pages.
Grabska et al., "Silicon-germanium alloys for photonics applications", Photonics North, Quebec City, Canada, May 2019, 19 pages.
Grabska et al., "SiGe compound for compact high speed electroabsorption modulators" PSCS Zepler Institute Day, Southampton, 1 page.
Grabska et al., "Multi composition GeSi tuneable concentration silicon-germanium wire structures for CMOS photonics", Enlighten Conference 2019, 1 page.
Grabska et al., "CMOS photonics", Enlighten Conference 2018, 1 page.
Grabska et al., "Silicon-Germanium for photonics applications", Silicon Photonics Summer School, Ghent, Belgium, 2016, 1 page.

* cited by examiner

OPTOELECTRONIC DEVICE AND METHOD OF MANUFACTURING THEREOF

CROSS REFERENCE TO RELATE APPLICATIONS

This application is a '371 Application of PCT/EP2018/065092, filed Jun. 7, 2018, by Frederic Yannick Gardes et al. and titled, "Optoelectronic Device and Method of Manufacturing Thereof," which claims priority to GB 1709213.1 filed Jun. 9, 2017, the entire teachings of which are incorporated herein by reference in their entirety, for all purposes.

FIELD OF THE INVENTION

The present invention relates to silicon-based optoelectronic devices, particularly electro-absorption modulators or metal-oxide semiconductor capacitor modulators, which include inclined or angled sidewalls.

BACKGROUND OF THE INVENTION

Photonic interconnection solutions are advantageous over conventional electrical interconnects as they generally have lower energies per bit transferred and high power efficiency at higher date transfer rates. Furthermore, through wavelength division multiplexing, photonic interconnects can reduce interconnection costs by enabling multiple data channels to travel in a single interconnect.

A challenge to be solved is to fabricate micro-scale optoelectronic devices that provide low energies per bit and high power efficiency, whilst also offering high bandwidth density to exploit to the fullest potential wavelength division multiplexing.

Two micro-scale optoelectronic devices of particular interest are electro-absorption modulators (EAM) and metal-oxide semiconductor capacitor (MOSCAP) modulators. EAMs generally operate through the Franz-Keldysh effect, whereby the introduction of an electromagnetic field (e.g. voltage) across a region influences the absorption of light within that region. MOSCAP modulators, in contrast, operate to influence the phase of light passing through the device.

SUMMARY OF THE INVENTION

Accordingly, the present invention aims to solve the above problems by providing, in a first aspect, an optoelectronic device, including:

a layer disposed above a substrate, the layer having a first cavity therein, which cavity is at least partially defined by an inclined interface between the cavity and an insulating liner, the interface being disposed at an angle relative to the substrate of greater than 0° and less than or equal to 90°; and a regrown semiconductor material, providing or forming a part of a waveguide, the regrown semiconductor material being at least partially disposed in the first cavity and including an inclined interface between the regrown semiconductor material and the insulating liner, the interface being disposed at an angle relative to the substrate of greater than 0° and less than or equal to 90°.

In a second aspect, the invention provides a method of manufacturing an optoelectronic device, having the steps of:

providing a layer above a substrate;

etching in the layer: a first cavity, a second cavity, and a channel connecting the first and second cavity, wherein the first cavity is at least partially defined by a sidewall which is inclined relative to the substrate;

lining the sidewalls of the first cavity with an insulating liner;

depositing a blanket layer to fill the first and second cavity;

depositing an insulating layer over the blanket layer;

annealing the optoelectronic device to melt the blanket layer and subsequently cooling, thereby forming a regrown semiconductor material within the first cavity and the second cavity; and removing the insulating layer, and etching the regrown semiconductor material such that it provides or forms a part of a waveguide, the regrown semiconductor material including an inclined interface between the insulating liner and the regrown semiconductor material.

An advantage to this method (and devices produced therefrom) is that an optical device including an inclined sidewall may be manufactured whilst ensuring generally homogenous crystalline planes throughout.

The angle of the interfaces relative to the substrate may equally be described as being equal to or greater than 90° and less than 180°. However as will be appreciated, this describes the same angle in the opposite sense (e.g. counter clockwise as compared to clockwise). The angles may be referred to as angles relative to a surface of the substrate. As will be appreciated, a substrate is a generally planar object and so angles relative thereto may be considered angles relative to the planar surface of the substrate, where a 0° angle would lie along the plane of the substrate. By regrown semiconductor material, it may be meant that the material is provided through blanket or epitaxial growth and then annealed to provide a regrown material.

Optional features of the invention will now be set out. These are applicable singly or in any combination with any aspect of the invention.

The waveguide provided by or formed in part by the regrown semiconductor material may be a ridge waveguide, or a part of a ridge waveguide, with a corresponding slab disposed thereunder. The interface between the regrown semiconductor material and the insulating liner may be located between a region of the slab and the layer disposed above the substrate. The interface between the regrown semiconductor material and the insulating liner may be located between a region of the ridge waveguide and the layer disposed above the substrate. The ridge waveguide may comprise by a combination of a portion of the regrown semiconductor material and a portion of the layer above the substrate, which both extend above the slab in a direction away from the substrate. The regrown semiconductor material may be referred to as an optically active region.

The angle of the inclined interface between the cavity and the insulating liner and/or the inclined interface between the regrown semiconductor material and the insulating liner relative to the substrate may be greater than 0° and less than 90°.

The angles may be as measured in a plane perpendicular to a light guiding direction of the waveguide.

The layer disposed or provided above the substrate may be a silicon layer, the regrown semiconductor material may be a silicon and germanium waveguide, and/or the blanket layer may be a germanium blanket layer. Alternatively, at least part of the waveguide may be composed of germanium (Ge) and tin (Sn), and the blanket layer may be a germanium blanket layer. As a further alternative, at least part of the waveguide may be composed of silicon germanium tin (SiGeSn).

The optoelectronic device may further include a second cavity of the silicon layer, wherein the second cavity is filled with SiGe. Prior to annealing the device, the second cavity may contain Ge, which becomes SiGe after annealing.

The device may further include an N doped region of the regrown semiconductor material and a P doped region of the regrown semiconductor material; wherein the N doped region is separated from the P doped region by an undoped region of the regrown semiconductor material (i.e. to form a PIN junction), such that the optoelectronic device is operable as an electro-absorption modulator. The device may further include a first electrode and second electrode, each extending from an uppermost surface of the optoelectronic device to either the N doped region or the P doped region, wherein the N doped region and P doped region are disposed below the first and second electrodes. The device may further include an N+ doped region, comprising a part of the N doped region of the regrown semiconductor material, disposed adjacent to the first electrode; and a P+ doped region, comprising a part of the P doped region of the regrown semiconductor material, disposed adjacent to the second electrode. By P+ or N+, it may be meant that the region comprises dopants at a higher concentration than the P or N doped regions. Moreover, the device may be operable as a photodiode when the N doped region and P doped region are separated by a photon absorption layer (which may be the regrown semiconductor material).

A first doped region of the regrown semiconductor material, adjacent to the interface between the regrown semiconductor material and the insulating liner, may contain a first species of dopant; and a second doped region of the layer disposed above the substrate, that is adjacent to the interface between the cavity and the insulating liner, may contain a second species of dopant; wherein the device further includes: a first electrode, electrically connected to the first doped region; and a second electrode electrically connected to the second doped region; whereby the optoelectronic device is operable as a MOS-type capacitor.

The device may further include: a third doped region of the regrown semiconductor material containing a heavy level of dopants of the first species; a fourth doped region of the layer above the substrate containing a heavy level of dopants of the second species; wherein: the first electrode contacts the third doped region; and the second electrode contacts the fourth doped region. By heavily doped, it may be meant that the doping concentration of the regions contacted by the electrodes is substantially larger than the doping concentration of the other regions.

The doped region of the regrown semiconductor material and doped region of the layer above the substrate may extend towards an uppermost surface of the device, thereby providing a ridge waveguide.

The first cavity may be further defined by a bed comprised of a portion of the layer disposed above the substrate which is at the bottom of the cavity and the inclined interface, wherein the insulating liner extends between the bed of the cavity and the regrown semiconductor material. The bed may contain dopants of the second species, and a region of the regrown semiconductor material which opposes the bed across the insulating liner contains dopants of the first species. The bed may be considered the region of the layer above the substrate which provides the lowermost surface of the cavity.

The first cavity may be further defined by a bed, wherein the insulating liner extends between the bed of the cavity and the regrown semiconductor material; and a region of the regrown semiconductor material may extend away from the bed to thereby provide or form part of a ridge waveguide. The region of the regrown semiconductor material and the layer above the substrate may provide the ridge waveguide, and the insulating layer may be positioned at least partially within the ridge waveguide. A doped region of the ridge waveguide may contain dopants of a first species; and a doped region of the bed opposing the waveguide contains dopants of a second species. The doped region of the bed may extend beyond a width of the ridge waveguide. A border of the doped region of the bed may be aligned with the ridge waveguide.

The method may further include the steps of: doping a first region of the regrown semiconductor material with a first species of dopant; doping a second region of the regrown semiconductor material with a second species of dopant; and depositing first and second electrodes which are electrically connected to the first and second regions respectively; wherein the first and second regions are separated by undoped region of the regrown semiconductor material, such that the optoelectronic device is an electro-absorption modulator.

The method may further include the steps of: doping a first region of the regrown semiconductor material adjacent to the interface between the regrown semiconductor material and the insulating liner with a first species of dopant; doping the inclined sidewall of the first cavity with a second species of dopant; and depositing first and second electrodes, which are electrically connected to the first region and the doped inclined sidewall of the first cavity respectively; thereby manufacturing a metal-oxide semiconductor modulator.

The cavity may be further defined by a bed of the layer, and the method may include a step of doping the bed with the second species of dopant.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
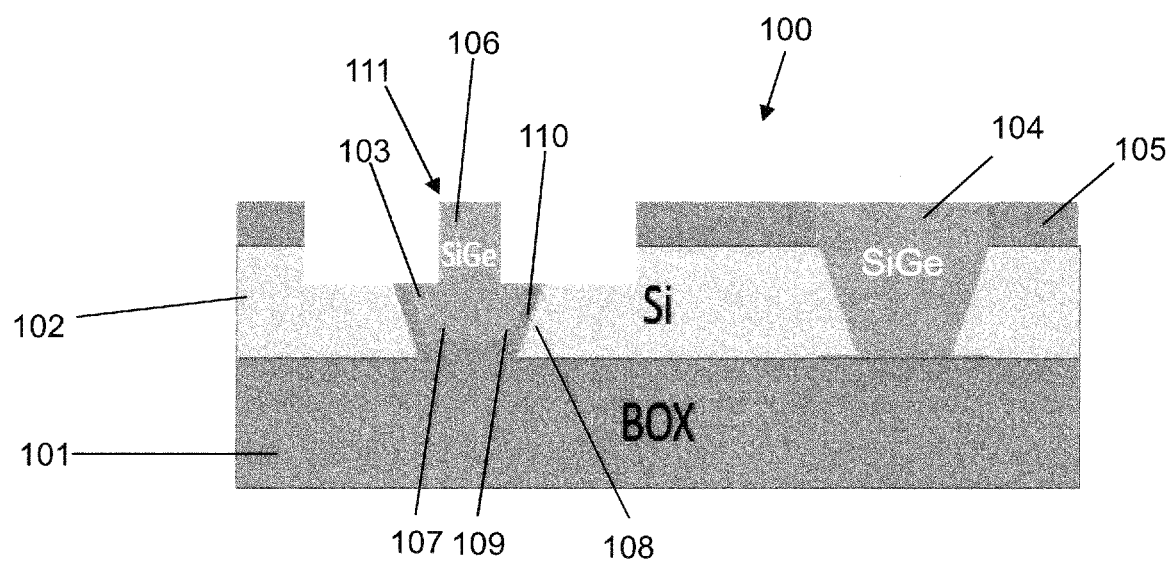
FIG. 1 shows an optoelectronic device in a planar cross-sectional view.

FIG. 1 shows an optoelectronic device 100 in a planar cross-sectional view. The device comprises a substrate 101, in this example a buried silicon oxide (BOX) layer, upon which is disposed a silicon layer 102. The silicon layer is partially covered by an insulating layer 105. The silicon layer has two cavities formed therein: a seed cavity 104 and a waveguide cavity 103. The seed cavity 104 contains, for example, SiGe as a result of a processing step described below. The waveguide cavity 103 includes a regrown semiconductor material (also referred to as an optically active region) 111, which includes a ridge waveguide 106 and a waveguide base or slab 107, which extends below the base of the waveguide cavity and is generally trapezoidal in shape. The waveguide ridge 106 extends from the waveguide base 107. A sidewall 109 of the waveguide base 107 is at an angle relative to the buried oxide layer of greater than 0° and less than 90° and defines an interface between the regrown semiconductor material and an insulating liner 110. In FIG. 1, the light guiding direction may be generally into/out of the plane of the image. In this example, the sidewall 109 is at an angle of approximately 80°. The angle may equally be described as larger than 90° but less than 180°, but as will be appreciated this describes the same angle but measured in an opposite sense (e.g. anti-clockwise as compared to clockwise). An adjacent sidewall 108 of the silicon layer, which provides an interface between the silicon layer 102 and the insulating liner 110, is also at an angle relative to the buried oxide layer of greater than 0° and less than 90°. In this example, the sidewalls are parallel to each other. The sidewall 109 of the waveguide and the sidewall 108 of the silicon layer are separated by the insulating liner 110.

Figure 2A:
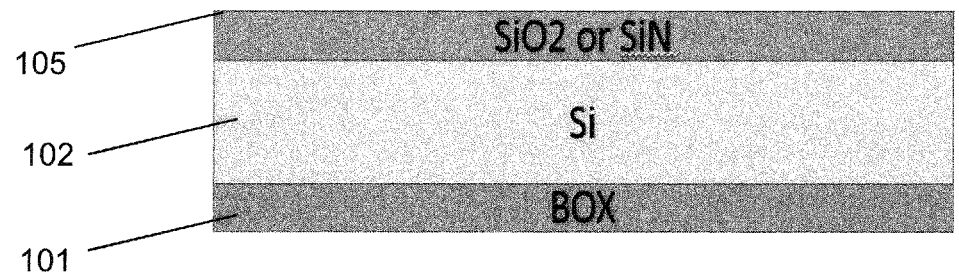
FIGS. 2A-2I show, respectively, stages of manufacturing the device shown in FIG. 1.

FIG. 2A shows a first processing step to produce the device shown in FIG. 1. A buried oxide (BOX) layer 101 is provided, and a silicon layer 102 disposed immediately on top of the BOX layer. An insulating layer 105 (for example SiO$_2$ or SiN) is then disposed on top of the silicon layer 102.

Figure 2B:
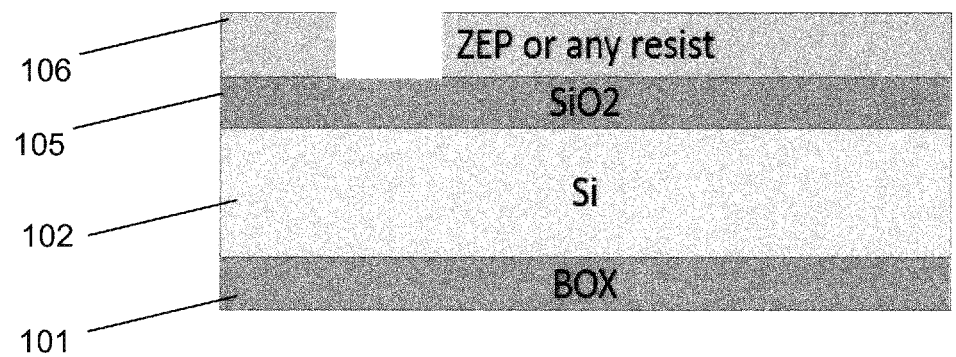

In the second processing step, shown in FIG. 2B, a resist 106 is disposed over the insulating layer 105. The resist may, for example, be an electro-beam ZEP resist. The resist is removed (or not disposed) over a section of the insulating layer 105 where the first and second cavities are to be formed.

Figure 2C:
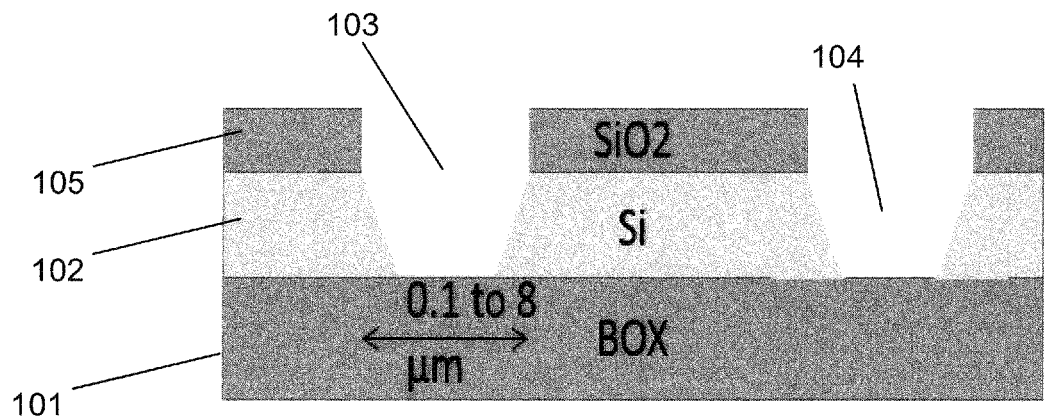
Figure 2D:
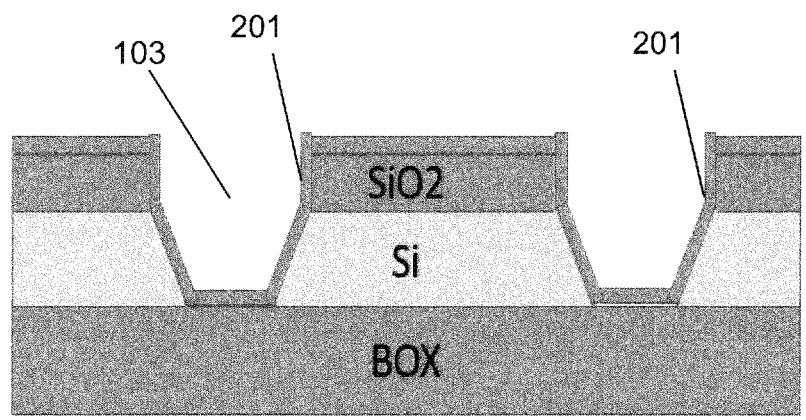

FIG. 2C shows the next processing step, where the seed cavity 104 and the waveguide cavity 103 are formed by etching. A channel (not shown) is also etched between the seed 104 and waveguide 103 cavities. The etching may be a wet etch (for example a Tetramethylammonium hydroxide etch) or a dry etch (for example, reactive ion etching or inductively coupled plasma etching). The etching is performed so as to produce an angled sidewall to at least a part of the cavity. The resist 106 is then removed, and the result is shown in FIG. 2C. An insulating liner 201 is then disposed in at least the waveguide cavity 103. The insulating liner 201 may be, for example, SiO$_2$. In some embodiments the seed cavity 104 is also lined with an insulating liner 201. However, in such examples, the insulating liner 201 is removed from the seed cavity 104 such that the silicon layer 102 is exposed.

Figure 2E:
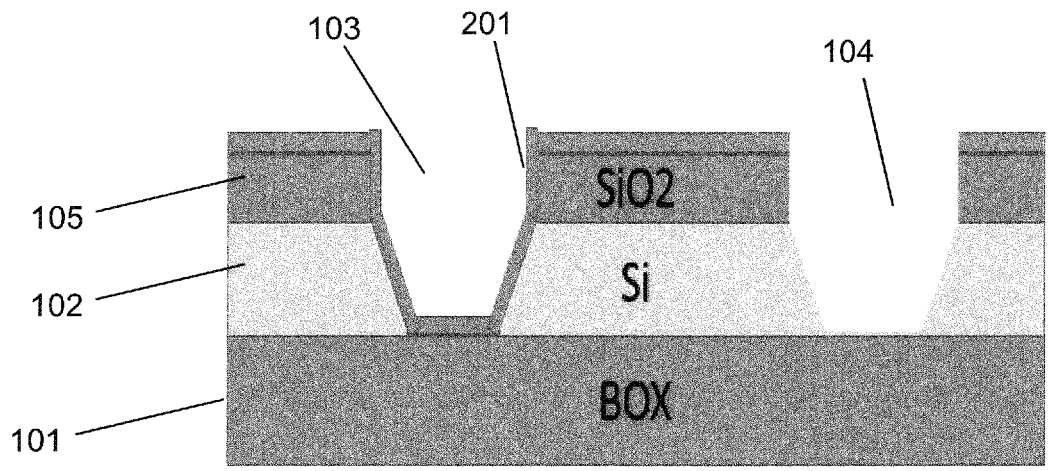

The result, by either method, should be a device as shown in FIG. 2E. This figure shows that the waveguide cavity 103 is lined with an insulating liner 201, whereas the seed cavity 104 is not. The next processing step includes the blanket deposition of germanium. This deposition fills both the waveguide cavity 103 and the seed cavity 104. Not shown in this figure is a trench, which runs from the seed cavity 104 to the waveguide cavity 103 and connects them. Therefore, after the germanium has been deposited, the trench is filled and the germanium is continuous from the waveguide cavity to the seed cavity.

Figure 2F:
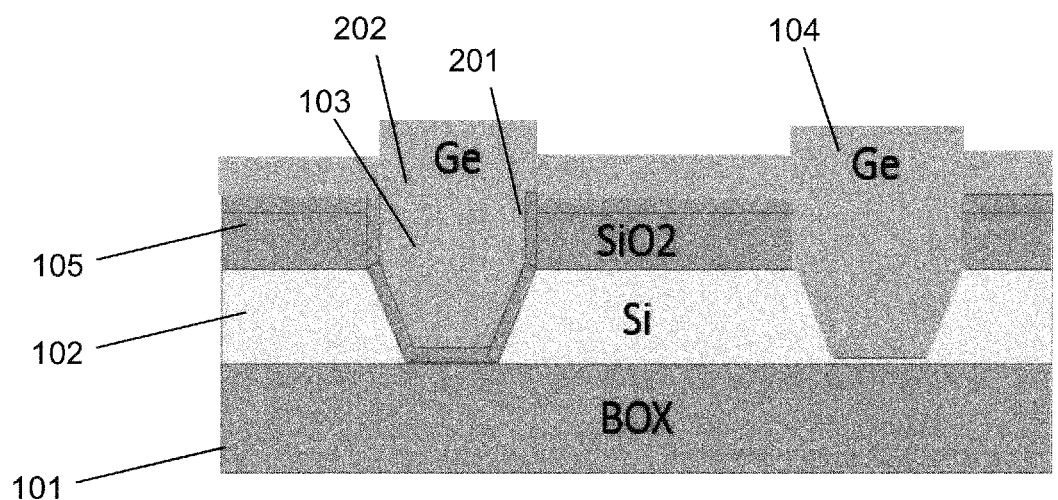
Figure 2G:
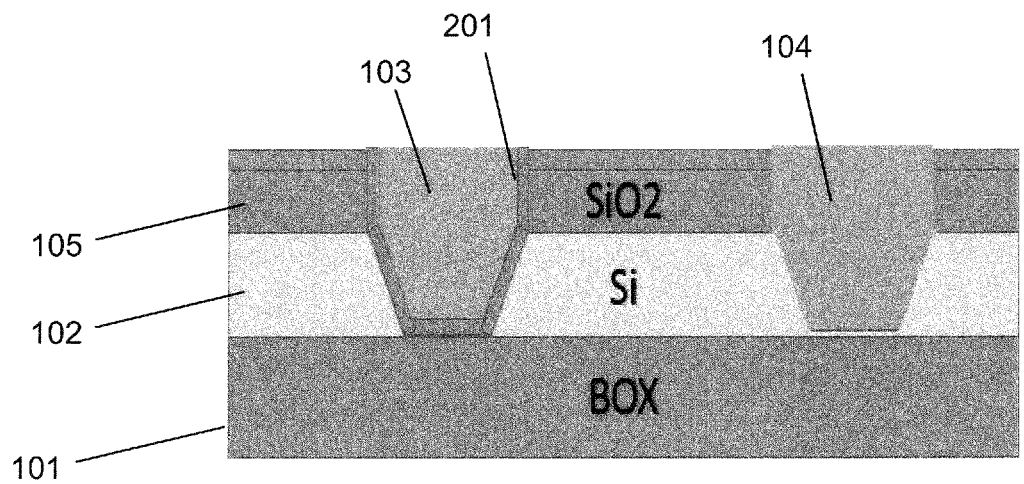

After the germanium has been deposited, a chemical-mechanical planarization process is performed to remove any germanium which extends above the insulating layer 105. FIG. 2G shows the result of this chemical-machine planarization. Subsequently, the insulating layer 105 is removed (along with a portion of the deposited germanium), and a capping layer 202 is disposed on top of the device. The capping layer 202 may be, for example, SiO$_2$. After the capping layer is disposed, the device is annealed at a high temperature (for example >930° C.). This anneal completes the rapid-melt-growth (RMG) processing of this device, by forming a SiGe waveguide 106 in the waveguide cavity as silicon flows from the silicon layer 102, into the seed cavity 104 and then into the waveguide cavity thereby forming a SiGe waveguide. The insulating liner 201 is still present between the waveguide 106 and silicon layer 102. The RMG process is similar to that discussed in WO 2015/185750 A1, the contents of which are incorporated herein by reference.

After the annealing stage, a portion 203 of the capping layer 202 and silicon layer 102 may be removed to produce a ridged waveguide 106. The ridged waveguide 106 extends from a waveguide base 107, the waveguide base 107 including a waveguide sidewall 108 which is at an angle relative to the substrate of greater than 0° but less than 90°.

Figure 3A:
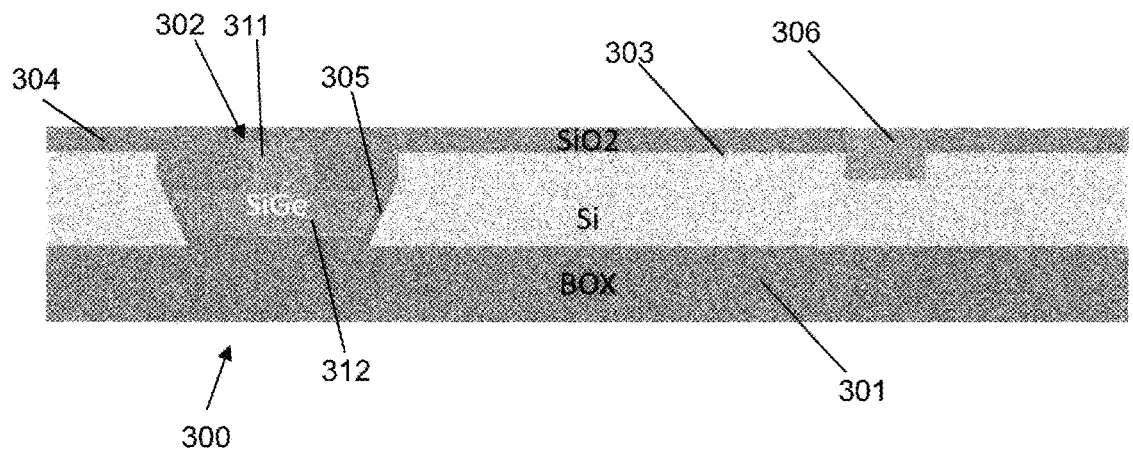
FIGS. 3A and 3B show related optoelectronic devices in planar cross-sectional views.

FIG. 3A shows a device 300 manufactured according the above described process. A buried oxide (BOX) layer 301 is provided, upon which a silicon layer 303 is disposed. The silicon layer 303 is capped by a capping layer 304. Within the waveguide cavity of the silicon layer 303 is regrown semiconductor material 302, which has an inclined or angled sidewall 305 relative to the substrate as discussed above. The regrown semiconductor material 302 includes a ridge waveguide 311 and a waveguide base or slab 312. The seed cavity 306 (which was used in the manufacturing stages) is also shown. The device 300 is operable as a SiGe waveguide.

Figure 3B:
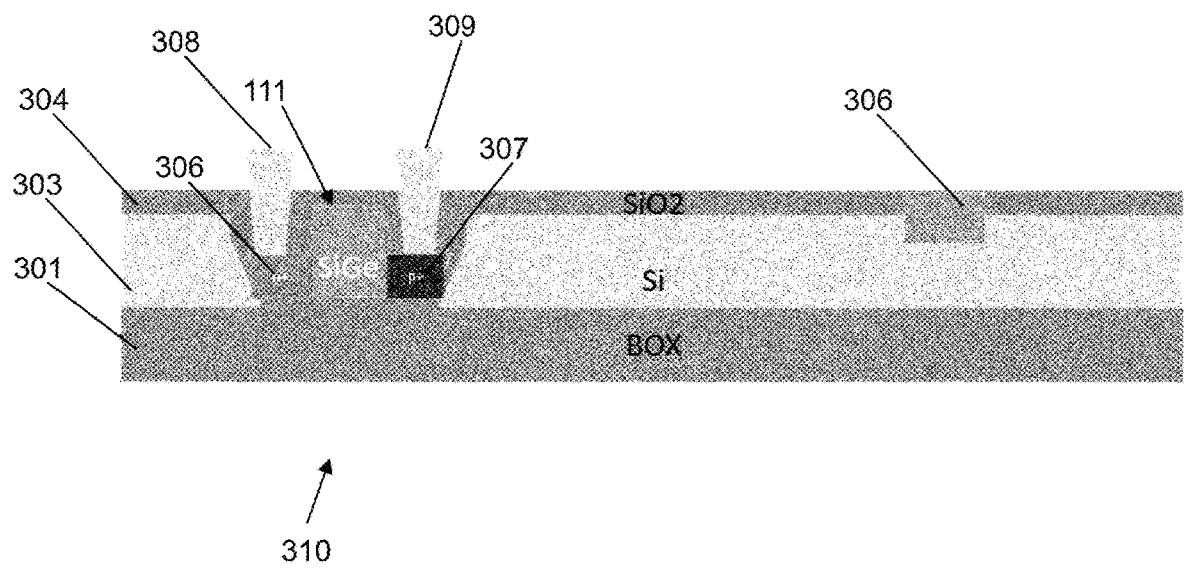

FIG. 3B shows a variant device 310, which is operable as an electro-absorption modulator. Here, a first region 306 located in the slab of the regrown semiconductor material 302 has been doped with dopants of a first species and a second region 307 of the regrown semiconductor material has been doped with dopants of a second species. In this embodiments, the dopants of the first species are N type dopants whereas the dopants of the second species are P type dopants. The doped regions are in the base of the waveguide. The first and second regions are connected, respectively, to a first electrode 308 and second electrode 309. Therefore, by applying a voltage to the first and second electrodes, the device 310 may be operated as an electro-absorption modulator, modulating light which passes through the ridge waveguide 311. In further developments of this device, the doped regions may extend up a sidewall of the ridge waveguide 311. For example, the first doped region 306 may extend up a left sidewall of the ridge waveguide and the second doped region 307 may extend up a right sidewall of the ridge waveguide. In a further example of the device, the first or second doped region may extend along a lowermost surface of the ridge waveguide 311 and the other doped region may extend along an uppermost surface of the ridge waveguide 311, such that an applied electric field is directed vertically or diagonally across the ridge waveguide.

Figure 4A:
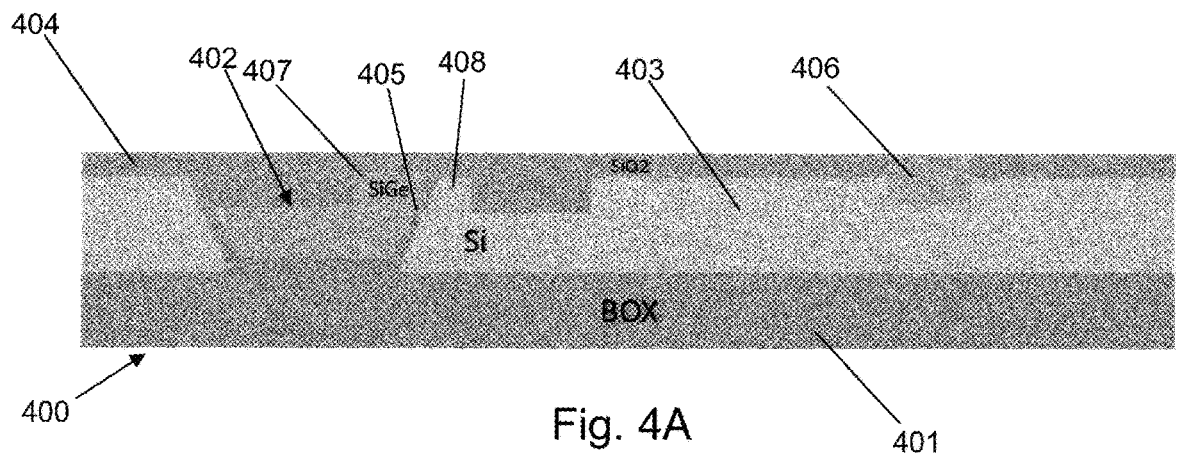
FIGS. 4A-4C show variant related optoelectronic devices in planar cross-sectional views.

FIG. 4A shows a further variant device 400. The device comprises a buried oxide layer 401, on top of which is a silicon layer 403. The silicon layer 403 is capped by capping layer 404. The seed cavity 406 is shown, and within the waveguide cavity there is a regrown semiconductor material 402. In contrast to the device shown in FIG. 3*a*, the ridge 407 is formed from a portion i.e. a part of the regrown semiconductor material 402, a portion 408 of the silicon layer, and a portion of the insulating liner 405. The insulating liner 405 is disposed between the regrown semiconductor material and the silicon layer.

Figure 2H:
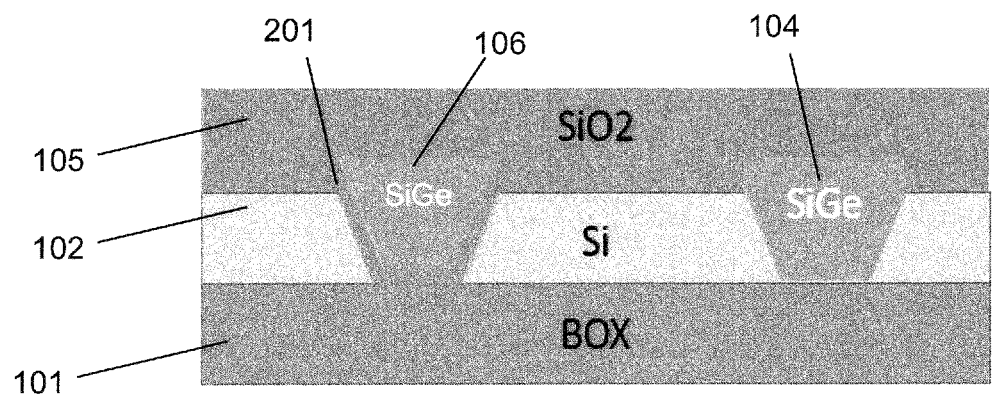
Figure 2I:
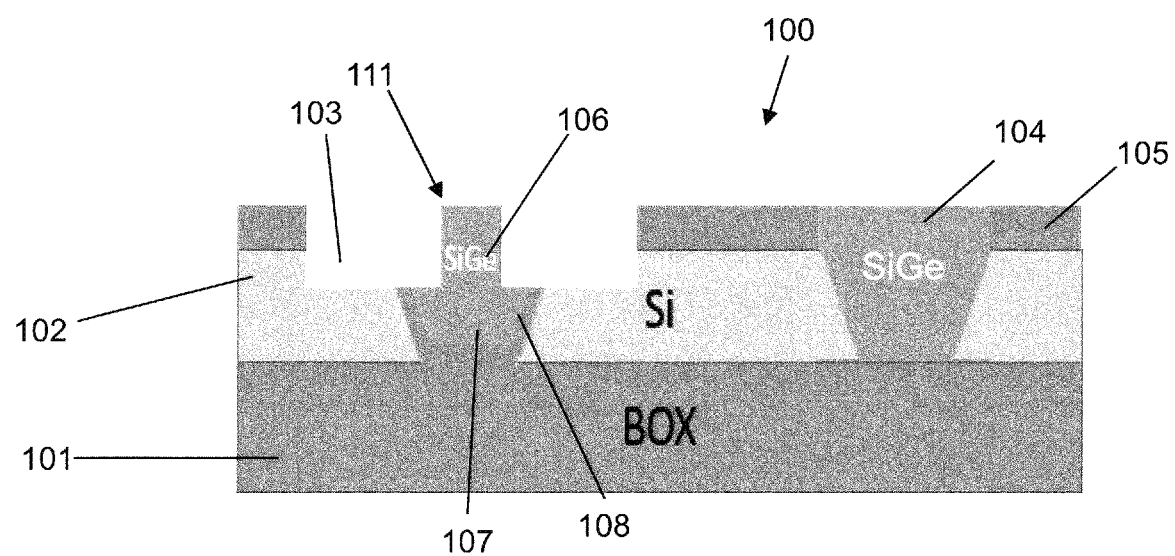
Figure 4B:
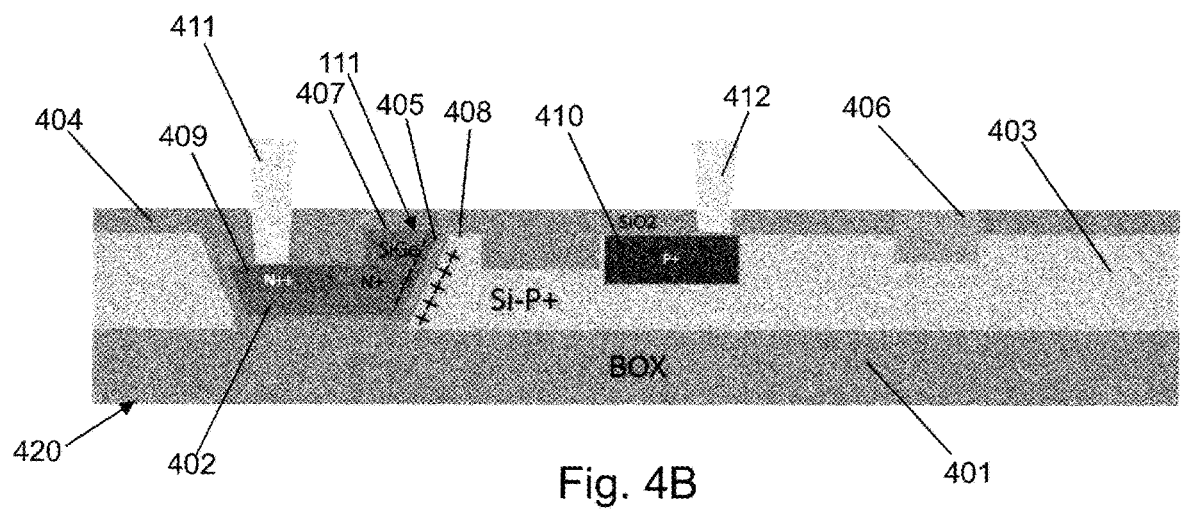

A development of the device 400 is shown in in FIG. 4B, where device 420 is operable as a metal oxide semiconductor capacitor (MOSCAP). The device 420 shares a number of features with the device 400 and therefore like features are indicated by like reference numerals. In contrast to the device 400 however, is that substantially all of the silicon layer 403 has been doped with a first species of dopant (in this example, a P type dopant). Furthermore, the regrown semiconductor material 402 has been doped with a second species of dopant (in this example, an N type dopant). This allows a charge build up across the gap provided by the insulating liner 405, and so the device is operable as a MOSCAP. The doping concentration in the regrown semiconductor material and silicon layer may be in the range of $1 \times 10^{16}$-$1 \times 10^{19}$ m$^{-3}$. The angle the insulating liner 405 is disposed at relative to the substrate is, in some embodiments, between 45° and 135° but not 90°. The thickness of the insulating liner may be between 5 nm and 100 nm, and may preferably be between 5 nm and 50 nm. In examples where the device is an EAM, the thickness may preferably be between 5 nm and 50 nm. In examples where the device is a MOSCAP the thickness may be between 5 nm and 20 nm. This thickness may be measured from the interface between the regrown semiconductor material and the insulating liner to the interface between the insulating liner and the silicon layer. The doping of the silicon layer may be performed before the blanket deposition of Germanium described in FIG. 2F. The doping of the regrown semiconductor material may be performed after the device has been annealed (as described in relation to FIG. 2H).

In this embodiment, a region 409 of the regrown semiconductor material 402 is heavily doped in comparison to the other regions of the regrown semiconductor material. A first electrode 411 is then connected to this heavily doped region 409. Similarly, a region 410 of the silicon layer 403 is heavily doped in comparison to the other regions of the silicon layer. A second electrode 412 is then connected to this heavily doped region.

Figure 4C:
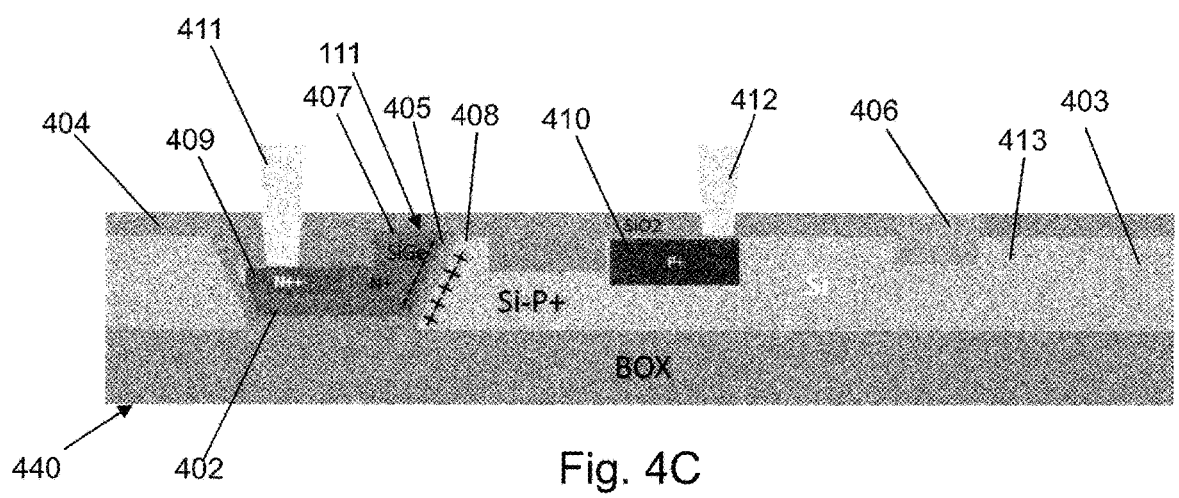

FIG. 4C shows a variant device 440 to the device 420 shown in FIG. 4B. In contrast to device 420, the silicon layer 402 in device 440 is only partially doped with dopant. The doped region 408 of the silicon layer 403 in this embodiments extends only as far as the second electrode 412.

Figure 5A:
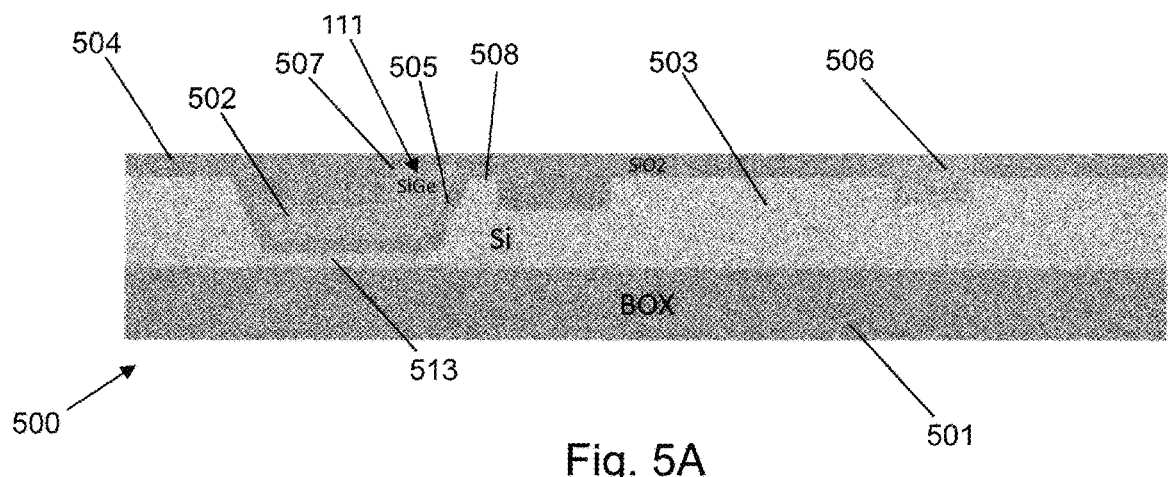
FIGS. 5A-5C show further variant related optoelectronic devices in planar cross-sectional views.

A variant device 500 is shown in Figure 5A. The device comprises a BOX layer 501, upon which is disposed a silicon layer 503. The silicon layer is capped with a capping layer 504. As with the device 400 discussed above, a regrown semiconductor material 502 is provided in a waveguide cavity of the silicon layer 503, and a ridge 507 of the waveguide is formed of both a portion of the regrown semiconductor material 502, a portion 508 of the silicon layer, and a portion of the insulating liner. However, in contrast to the devices described above, a part or bed 513 of the silicon layer 503 extends under the regrown semiconductor material 502 i.e. not all of the silicon layer was etched away when producing the waveguide cavity. Therefore the insulating layer 505 extends from a sidewall 508 of the silicon layer and underneath the SiGe waveguide 502 between the waveguide and the part 513 of the silicon layer.

Figure 5B:
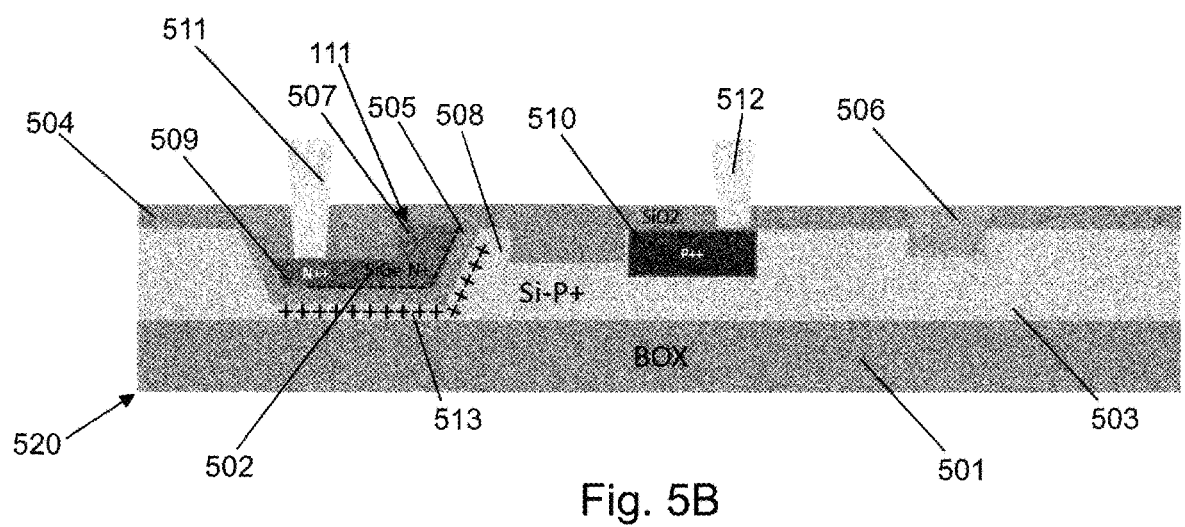

FIG. 5B shows a variant device 510 which shares a number of features with the device 500 discussed above. Like features are indicated by like reference numerals. In contrast to the device 500 discussed above, the silicon layer 503 in device 520 has been doped with dopants of a first species (in this example, a P type dopant). Similarly, the SiGe waveguide 502 has been doped with dopants of a second species (in this example, an N type dopant). This can allow for charge build-up on the faces of the SiGe waveguide and sidewall 508 of the silicon layer which face each other across the insulating layer 505. Notably, a bed 513 of the silicon layer extending beneath the SiGe waveguide 502 is also doped. As a result of the doping, the device 520 is operable as a MOSCAP. This bed can be provided by not etching away all of the silicon layer in the step illustrated in FIG. 2C. By doping the bed 513 of the silicon layer which extends beneath the SiGe waveguide 502, the efficiency of the device can be improved. The doping concentration in the SiGe waveguide and silicon layer may be in the range of $1 \times 10^{16}$-$1 \times 10^{19}$ m$^{-3}$. The angle between the substrate and the insulating liner 505 is, in some embodiments, between 45° and 135° but not 90°. The doping of the silicon layer may be performed before the blanket deposition of Germanium described in FIG. 2F. The doping of the SiGe waveguide may be performed after the device has been annealed (as described in relation to FIG. 2H).

In this embodiment, a region 509 of the SiGe waveguide 502 is heavily doped in comparison to the other regions of the SiGe waveguide (for example, it is N++ doped). A first electrode 511 is then connected to this heavily doped region 509. Similarly, a region 510 of the silicon layer 503 is heavily doped in comparison to the other regions of the silicon layer. A second electrode 512 is then connected to this heavily doped region.

Figure 5C:
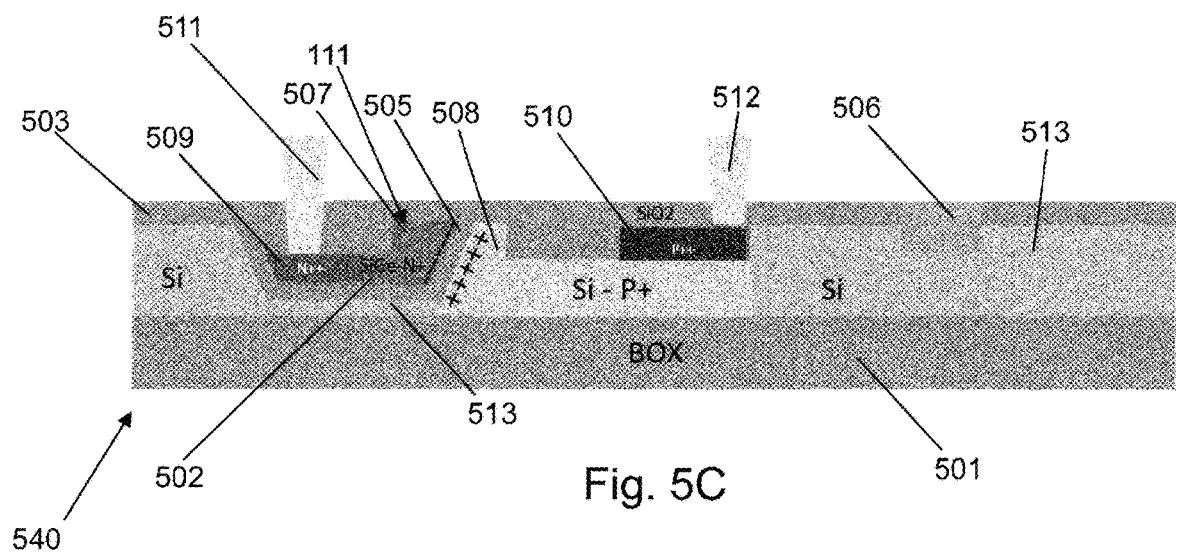

A further variant device 540 is shown in FIG. 5C. This device differs from the device 520 discussed above in that the bed 513 of the silicon layer disposed beneath the SiGe waveguide is not doped. By not doping this part, the overall capacitance of the MOSCAP device 540 is reduced and therefore a higher operating speed may be achieved.

Figure 6A:
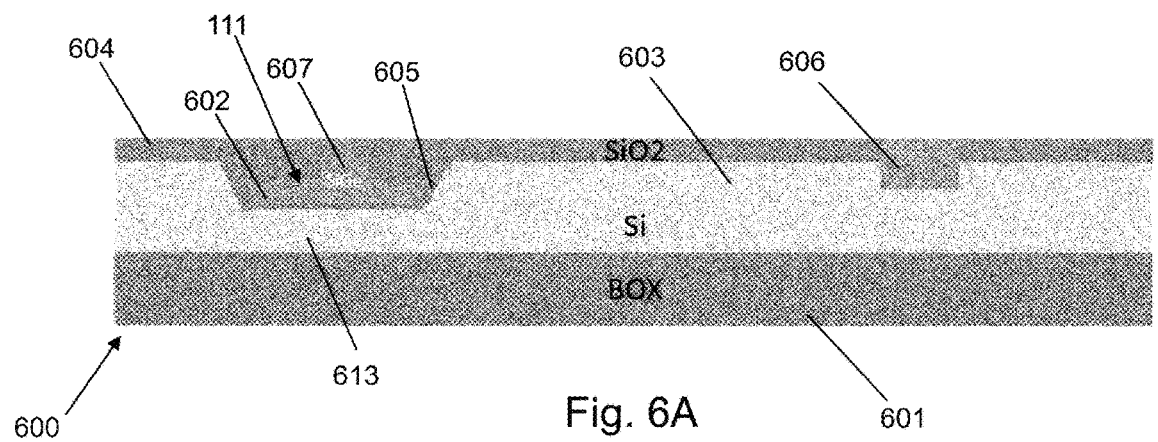
FIGS. 6A-6C show further variant related optoelectronic devices in planar cross-sectional views.

FIG. 6A shows a variant device 600. The device includes a BOX layer 601, atop of which is a silicon layer 603. The silicon layer is capped with a capping layer 604. A SiGe waveguide 602 is disposed in a cavity of the silicon layer 603, and a seed cavity 606 of the silicon layer 603 is filled with SiGe. Between the SiGe waveguide 602 and the silicon layer 603 is an insulating liner 605. The silicon layer 603 extends beneath the SiGe waveguide 602 and provides a bed 613 of the waveguide cavity. This bed can be provided by not etching away all of the silicon layer in the step illustrated in FIG. 2C. The SiGe waveguide 602 includes a ridge 607 which is formed from a part of the SiGe waveguide.

Figure 6B:
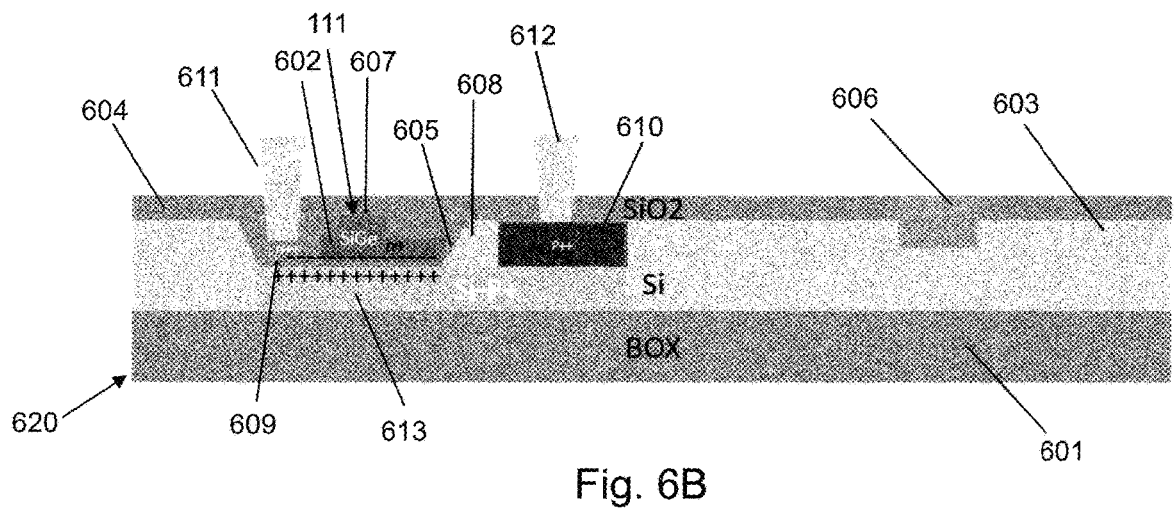

FIG. 6B shows a variant device 620 which shares a number of features with the device 600 discussed above. Like features are indicated by like reference numerals. In contrast to the device 600 discussed above, the silicon layer 603 in device 620 has been doped with dopants of a first species (in this example, a P type dopant). Similarly, the SiGe waveguide 602 has been doped with dopants of a second species (in this example, an N type dopant). However, in contrast to the device 520 shown in FIG. 5B, the sidewall 608 of the silicon layer 603 has not been doped. Therefore the doped region of the silicon layer 602 extends from the bed 613 of the silicon layer only. This can allow for charge build-up on the faces of the SiGe waveguide and bed of the silicon layer which face each other across the insulating liner 605, and therefore device 620 is operable as MOSCAP. The doping concentration in the SiGe waveguide and silicon layer may be in the range of $1 \times 10^{16}$-$1 \times 10^{19}$ m$^{-3}$. The angle between the substrate and the insulating liner 505 is, in some embodiments, between 45° and 135° but not 90°. The doping of the silicon layer may be performed before the blanket deposition of Germanium described in FIG. 2F. The doping of the SiGe waveguide may be performed after the device has been annealed (as described in relation to FIG. 2H).

In this embodiment, a region 609 of the SiGe waveguide 602 is heavily doped in comparison to the other regions of the SiGe waveguide. A first electrode 611 is then connected to this heavily doped region 609. Similarly, a region 610 of the silicon layer 603 is heavily doped in comparison to the other regions of the silicon layer. A second electrode 612 is then connected to this heavily doped region.

Figure 6C:
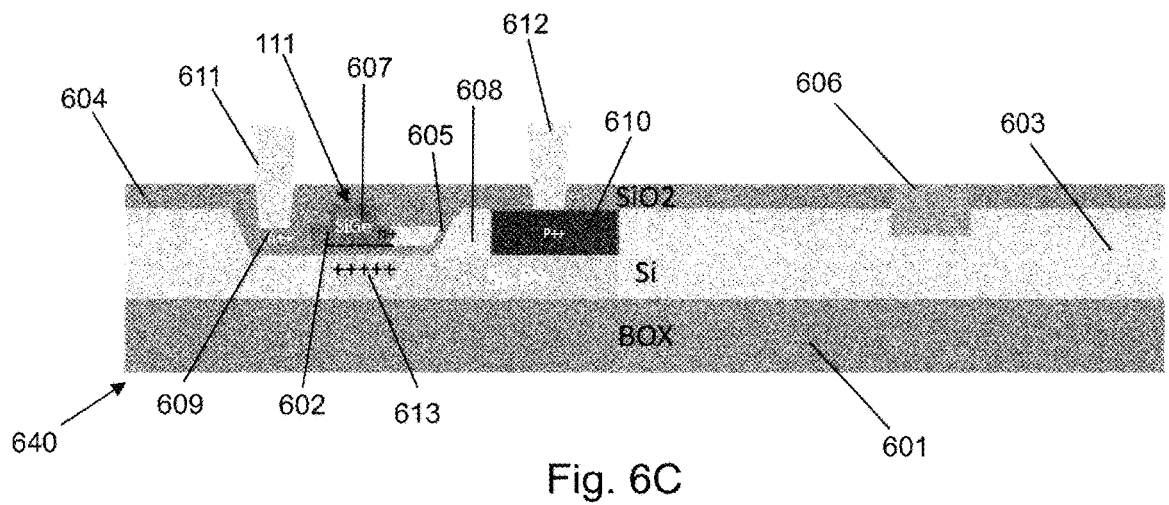

A variant device 640 is shown in FIG. 6C. In contrast to the device 620, the SiGe waveguide 607 and silicon layer 703 in device 640 is restricted in area. The doping of the SiGe waveguide extends only part of the way along the SiGe waveguide, and similarly the doping of the bed 613 of the silicon layer 603 extends only part of the way along the silicon layer. This can reduce the overall capacitance of the MOSCAP and may increase the operating speed of the device.

The examples disclosed herein use silicon, germanium, and silicon germanium (SiGe). However, tin, germanium, germanium tin (GeSn), and silicon germanium tin SiGeSn can equally be used in any of the examples discussed above.

In the examples disclosed above, there may be a further silicon layer (also referred to as a silicon handle layer) disposed below the buried oxide layer.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An optoelectronic device, including:
   a layer disposed above a substrate, the layer having a first cavity therein, which cavity is at least partially defined by an inclined interface between the cavity and an insulating liner, the interface being disposed at an angle relative to the substrate of greater than 0° and less than or equal to 90°;
   a regrown semiconductor material, providing or forming a part of a waveguide, the regrown semiconductor material being at least partly disposed in the first cavity and including an inclined interface between the regrown semiconductor material and the insulating liner, the interface being disposed at an angle relative to the substrate of greater than 0° and less than or equal to 90°;
   a first doped region of the regrown semiconductor material; and
   either a second doped region of the regrown semiconductor material such that the optoelectronic device is operable as an electro-absorption modulator or a photodiode, or
   a second doped region of the layer disposed above the substrate such that the optoelectronic device is operable as a MOS-type capacitor.

2. The optoelectronic device of claim 1, wherein the inclined interfaces are disposed at an angle relative to the substrate of greater than 0° and less than 90°.

3. The optoelectronic device of claim 1, wherein the angles are as measured in a plane perpendicular to a light guiding direction of the waveguide.

4. The optoelectronic device of claim 1, wherein the layer disposed above a substrate is formed of silicon, and the regrown semiconductor material is formed of silicon-germanium.

5. The optoelectronic device of claim 4, further including:
   a second cavity of the silicon layer, wherein the second cavity is filled with SiGe.

6. The optoelectronic device of claim 1, wherein:
   the optoelectronic device is an electro-absorption modulator or a photodiode;
   the first doped region of the regrown semiconductor material is an N doped region of the regrown semiconductor material;
   the second doped region of the regrown semiconductor material is a P doped region of the regrown semiconductor material; and
   wherein the N doped region is separated from the P doped region by an undoped region of the regrown semiconductor material.

7. The optoelectronic device of claim 6, wherein:
   the optoelectronic device is operable as an electro-absorption modulator; and
   the optoelectronic device further includes a first electrode and second electrode, each extending from an uppermost surface of the optoelectronic device to either the N doped region or the P doped region, wherein the N doped region and P doped region are disposed below the first and second electrodes.

8. The optoelectronic device of claim 7, further including an N+ doped region, comprising a part of the N doped region of the regrown semiconductor material, disposed adjacent to the first electrode; and
   a P+ doped region, comprising a part of the P doped region of the regrown semiconductor material, disposed adjacent to the second electrode.

9. The optoelectronic device of claim 1, wherein:
   the optoelectronic device is operable as a MOS-type capacitor;
   the first doped region of the regrown semiconductor material is adjacent to the interface between the regrown semiconductor material and the insulating liner, and contains a first species of dopant; and
   the second doped region of the layer disposed above the substrate is adjacent to the interface between the cavity and the insulating layer, and contains a second species of dopant;
   wherein the device further includes:
      a first electrode, electrically connected to the first doped region; and
      a second electrode electrically connected to the second doped region.

10. The optoelectronic device of claim 9, further including:
    a third doped region of the regrown semiconductor material containing a heavy level of dopants of the first species;
    a fourth doped region of the layer above the substrate containing a heavy level of dopants of the second species; wherein:
    the first electrode contacts the third doped region; and
    the second electrode contacts the fourth doped region.

11. The optoelectronic device of claim 9, wherein the first doped region of the regrown semiconductor material and the second doped region of the layer above the substrate extend towards an uppermost surface of the device, thereby providing a ridge waveguide.

12. The optoelectronic device of claim 9, wherein:
the first cavity is further defined by a bed, wherein the insulating layer extends between the bed of the cavity and the regrown semiconductor material.

13. The optoelectronic device of claim 12, wherein the bed contains dopants of the second species, and a region of the regrown semiconductor material which opposes the bed across the insulating layer contains dopants of the first species.

14. The optoelectronic device of claim 1, wherein:
the first cavity is further defined by a bed, wherein the insulating layer extends between the bed of the cavity and the regrown semiconductor material; and
a region of the regrown semiconductor material extends away from the bed to thereby provide or form a part of a ridge waveguide.

15. The optoelectronic device of claim 14, wherein the region of the regrown semiconductor material and the layer above the substrate provide the ridge waveguide, and the insulating layer is positioned at least partially within the ridge waveguide.

16. The optoelectronic device of claim 14, wherein:
a doped region of the regrown semiconductor material including the ridge waveguide contains dopants of a first species; and
a doped region of the bed opposing the regrown semiconductor material contains dopants of a second species.

17. Optoelectronic device of claim 16, wherein:
the doped region of the bed extends beyond a width of the ridge waveguide, or a border of the doped region of the bed is aligned with the ridge waveguide.

18. A method of manufacturing an optoelectronic device, the method comprising:
providing a layer above a substrate;
etching in the layer: a first cavity, a second cavity, and a channel connecting the first and second cavity, wherein the first cavity is at least partially defined by a sidewall which is inclined relative to the substrate;
lining the sidewalls of the first cavity with an insulating liner;
depositing a blanket layer to fill the first and second cavity;
depositing an insulating capping layer over the blanket layer;
annealing the optoelectronic device to melt the blanket layer and subsequently cooling, thereby forming a regrown semiconductor material within the first cavity and the second cavity; and
removing the insulating capping layer, and etching the regrown semiconductor material such that it provides or forms a part of a waveguide, the regrown semiconductor material including an inclined interface between the insulating liner and the regrown semiconductor material.

19. The method of claim 18,
further including:
doping a first region of the regrown semiconductor material adjacent to the interface between the regrown semiconductor material and the insulating liner with a first species of dopant;
doping a second region of the waveguide with a second species of dopant; and
depositing first and second electrodes which are electrically connected to the first and second regions respectively;
wherein the first and second regions are separated by undoped region of the waveguide, such that the optoelectronic device is an electro-absorption modulator; or
further including:
doping the inclined sidewall of the first cavity with a second species of dopant; and
depositing first and second electrodes, which are electrically connected to the first region and the doped inclined sidewall of the first cavity respectively;
thereby manufacturing a metal-oxide semiconductor modulator.

20. The method of claim 19, wherein the cavity is further defined by a bed of the layer, and the method includes a step of doping the bed with the second species of dopant.

* * * * *